Patented July 15, 1941

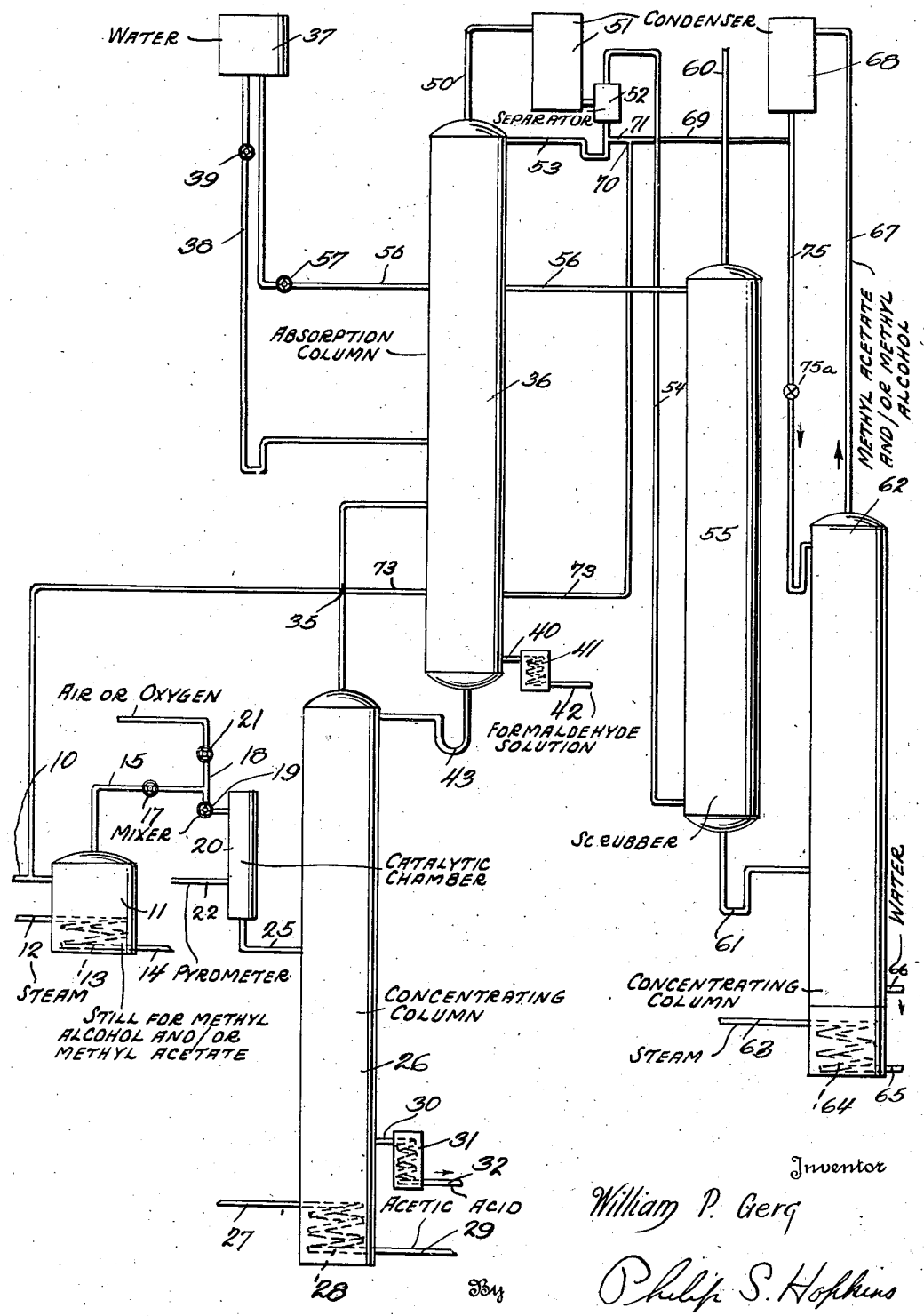

2,249,380

UNITED STATES PATENT OFFICE 2,249,380

PROCESS FOR PRODUCING FORMALDEHYDE AND ACETIC ACID

William P. Gerg, Hancock, N. Y.

Application February 4, 1938, Serial No. 188,756

4 Claims. (Cl. 260—606)

This invention relates to a process for the production of formaldehyde and acetic acid.

A primary object of this invention is the provision of a process whereby substantially pure formaldehyde may be formed directly from methyl acetate with a minimum of steps and operations.

A further object is the provision of a process whereby formaldehyde may be produced from either methyl acetate, methyl alcohol or a mixture of the two.

An additional object is the provision of such a process of producing formaldehyde whereby acetic acid may also be produced by the same process and the resulting products, formaldehyde and acetic acid, recovered from methyl acetate or methyl alcohol or a mixture of the two simultaneously.

An additional object is the provision of a process carrying out the above objects wherein a relatively simple form of apparatus may be utilized requiring the use of a relatively small amount of heat and producing a relatively great yield of the products of the process with a minimum of steps.

The invention therefore, consists in the sequence of operations and certain novel steps comprising the process together with the combinations of ingredients utilized in conjunction therewith all as will be more fully pointed out hereinafter and shown in the accompanying drawing wherein:

The single figure illustrates a diagrammatic representation of one form of apparatus suitable for carrying out the process of the instant invention.

Having reference now to the drawing there is indicated at 10 an inlet pipe leading to a still or vaporizer 11. Methyl acetate or methyl alcohol or any desired mixture of the two is introduced into still 11 through pipe 10 where it is volatilized by heat generated by steam which enters a coil 13 in still 11 through a pipe 12 and exits therefrom through a pipe 14, or by any other desired heat producing means. The vapors of the mixture then exit from still 11 through a pipe 15, which contains a constant pressure reducing valve 17 which may be manually or automatically adjustable, to a pipe 18 where air or oxygen in desirable proportions is introduced to the vapors of methyl acetate and/or methyl alcohol. The vapors are mixed with the air or oxygen in any suitable mixing device 19 and passed into a catalytic chamber 20. Air or oxygen is supplied to pipe 18 from any desired source and the admission thereof controlled by a valve 21. Valve 21 may be manually or automatically controlled in accordance with the proportion of the mixture in catalytic chamber 20 as indicated by a pyrometer 22 positioned in catalytic chamber 20.

Catalytic chamber 20 may contain any suitable catalyst preferably one of the group comprised of: copper, silver, molybdenum, vanadium, iron, platinum, gold, zinc, cobalt, manganese, aluminum, nickel, palladium, cerium sulphate and thoria, or oxides of any of the above, or combinations of any two or more of them.

The catalyst may be in the form of a sponge, a wire, a colloidal suspension or an impregnated sheet of any suitable sustaining material such as pumice, asbestos or glass.

The catalytic reaction may be endothermic or exothermic and in the event that it is the latter external heat may be supplied to catalytic chamber 20 in any desired manner.

In the catalytic chamber the mixture of vapors of methyl acetate and/or methyl alcohol and air and/or oxygen are oxidized into acetic acid, formaldehyde, methyl alcohol and inert gases. The latter mixture passes through a pipe 25 to a concentrating column 26. Concentrating or fractional distillation column 26 is heated in order to accelerate the distillation of the compounds contained therein by steam which passes through a pipe 27 into a coil 28 contained in the bottom of column 26 and out of coil 28 through a pipe 29. In the concentrating column the formaldehyde and inert gases are further volatilized and the acetic acid concentrated. The concentrated acetic acid passes through a pipe 30 into a condenser 31, where it is liquefied and is drawn therefrom as through a pipe 32 into any desired storage receptacle. The mixture of formaldehyde and inert gases and unconverted methyl acetate and methyl alcohol, however, passes upwardly through a pipe 35 to a formaldehyde absorption column 36 where the formaldehyde is dissolved by the introduction of water, initially contained in a tank 37, which is passed through a pipe 38 controlled by a valve 39 into formaldehyde absorption column 36. The solution of formaldehyde is thence drawn through a pipe 40 into a condenser 41 and withdrawn therefrom through a pipe 42 into any desired storage receptacle in the desired commercial form of a 40% formaldehyde solution in water. A return line 43 is provided from the bottom of formaldehyde absorption column 36 to a point near the top of concentrating column 26 to balance column 26 in a known manner.

Thus from the foregoing it will be seen that acetic acid and formaldehyde may readily be produced by the catalytic oxidation of methyl acetate and/or methyl alcohol with oxygen or air according to one of the following reactions:

$$2CH_3CO_2CH_3 + O_2 = 2CH_3COOH + 2HCOH$$
$$CH_3CO_2CH_3 + CH_3OH + O_2 = CH_3COOH + 2HCHO + H_2O$$
$$2CH_3OH + O_2 = 2CH_2O + 2H_2O$$

In the case of the third equation no acetic acid is produced since there is no reaction doubling the carbon and that the oxidation is not carried far enough to produce acid.

The inert gases and unconverted methyl alcohol and methyl acetate which pass into formaldehyde absorption column 36 with the formaldehyde are passed therefrom through a pipe 50 to a condenser 51 and thence to a gas separating unit 52, a return line 53 leading from unit 52 to balance column 36. The remaining inert gases which contain a trace of methyl acetate and/or methyl alcohol are thence passed through a pipe 54 to a scrubbing column 55 wherein the methyl acetate and/or methyl alcohol is dissolved by the introduction of water from tank 37 through a pipe 56 under the control of a manual valve 57. The remaining inert gases, still in gaseous form pass from the top of column 55 through a pipe 60 whence they may escape to the atmosphere or be recovered for any desired purpose.

The solution of methyl acetate removed from the inert gases is passed through a pipe 61 to a concentrating column 62 supplied with steam or other heating medium through a pipe 63 leading to a coil 64 which has an exit 65. Here the water is freed of methyl acetate and/or methyl alcohol and passed in liquid form out of column 62 as through a pipe 66. The vaporized methyl acetate and/or methyl alcohol is passed out of column 62 through a pipe 67 to a condenser 68 whence it is passed through a pipe 69 to a junction 70 with a pipe 71 which leads from gas separating unit 52 wherein it should here be pointed out that a portion of the methyl acetate and/or methyl alcohol is removed from the inert gases, and the combined methyl acetate from pipes 71 and 69 is returned through a pipe 73 to pipe 10 to be revolatilized in still 11. A pipe 75 having a valve 75a therein leads from the bottom of condenser 68 to a point adjacent the top of concentrating column 62 to balance the column in a known manner.

Now from the foregoing it will be seen that there is herein provided an improved process for the production of formaldehyde and acetic acid from methyl acetate or methyl alcohol or any mixture of the two in a relatively inexpensive, simple and efficient manner.

Since many modifications may be made of the herein described process it is to be understood that all matter herein before set forth or shown in the accompanying drawing is to be interpreted merely as illustrative and not in a limiting sense.

I claim as my invention:

1. The process for simultaneously producing formaldehyde and acetic acid which comprises volatilizing methyl acetate, mixing the vapors therefrom with oxygen, oxidizing the resulting mixture in the presence of a vapor phase oxidation catalyst, the steps of passing the oxidized mixture including acetic acid and formaldehyde to a concentrating column, concentrating the acetic acid drawing off the same and passing the vaporized formaldehyde out of said column and separating the remaining methyl acetate from the formaldehyde.

2. The process for producing formaldehyde which comprises volatilizing methyl acetate, mixing the vapors therefrom with oxygen, oxidizing the resulting mixture in the presence of a vapor phase oxidation catalyst, the steps of passing the oxidized mixture of acetic acid, methyl alcohol, vaporized methyl acetate, formaldehyde and inert gases to a concentrating column separating acetic acid therefrom, passing the remaining mixture of formaldehyde, inert gases, methyl alcohol and methyl acetate to a formaldehyde absorption column forming a solution of formaldehyde and water, drawing off the said solution.

3. The process for producing formaldehyde which comprises volatilizing methyl acetate, mixing the vapors therefrom with oxygen, oxidizing the resulting mixture in the presence of a vapor phase oxidation catalyst, the steps of passing the oxidized mixture of acetic acid, methyl alcohol, vaporized methyl acetate, formaldehyde and inert gases to a concentrating column, passing the mixture of formaldehyde, inert gases, methyl acetate to a formaldehyde absorption column, forming a solution of formaldehyde and water, drawing off the said solution and separating the volatilized methyl acetate from the inert gases, condensing said methyl acetate and recycling the revolatilized mixture.

4. The process for simultaneously producing formaldehyde and acetic acid which comprises volatilizing methyl acetate, mixing the vapors therefrom with oxygen, oxidizing the resulting mixture in the presence of a vapor phase oxidation catalyst, the steps of passing the oxidized mixture of acetic acid, vaporized methyl acetate, formaldehyde and inert gases to a concentrating column, passing the mixture of formaldehyde, inert gases, methyl alcohol and methyl acetate to a formaldehyde absorption column forming a solution of formaldehyde and water, and drawing off the said solution.

WILLIAM P. GERG.